United States Patent Office 2,772,304
Patented Nov. 27, 1956

2,772,304

PROCESS FOR PURIFYING ACRYLONITRILE FORMED BY SYNTHESIS FROM ACETYLENE AND HYDROGEN CYANIDE

Umberto Maffezzoni and Fernando Aloigi Luzzi, Milan, Italy, assignors to Montecatini, Societa Generale per l'Industria Mineraria e Chimica, a corporation of Italy No Drawing. Application November 24, 1953, Serial No. 394,226

Claims priority, application Italy December 11, 1952

6 Claims. (Cl. 260—465.3)

Acrylonitrile obtained synthetically from acetylene and hydrogen cyanide contains some impurities, such as hydrogen cyanide, lactonitrile and acetaldehyde. The removal of these substances which is generally tedious and very difficult has been hitherto accomplished by one of following methods:

(a) By refining the crude acrylonitrile by means of distillation. Such a method, however, does not permit the complete removal of the above mentioned impurities, because during distillation acrylonitrile easily undergoes decomposition, as soon as temperature is raised above 50° C., to form hydrogen cyanide and acetaldehyde. On the other hand, both these components will combine again with each other to form lactonitrile and an equilibrium expressed in the following reaction is ultimately reached:

$$CH_3.CHOH.CN \rightleftharpoons CH_3.CHO + HCN$$

so that the distilled product is again contaminated with hydrogen cyanide, acetaldehyde and lactonitrile. A complete removal of these impurities is not attained even if the distillation is carried out at reduced pressure.

(b) Crude acrylonitrile is subjected to a countercurrent washing with water, whereby a great part of acetaldehyde, hydrogen cyanide and lactonitrile are extracted. This process requires, however, a substantial amount of water, from which dissolved lactonitrile has to be recovered, while the acrylonitrile obtained still contains small quantities of said products.

(c) Crude acrylonitrile, contaminated with small amounts of HCN, is treated with a suspension of copper oxide. This method is suitable for removing small amounts of hydrogen cyanide, since in that case the recovery of hydrogen cyanidfe and of copper or other heavy metal, may be neglected. Where, however, crude acrylonitrile contains a larger percentage of HCN which has to be removed it would be desirable to recover HCN and copper, which however results in a considerable increase of the process cost.

Now it has been found, and this is the object of the present invention, that if acrylonitrile is treated with ferrous sulfate and an alkali so that the free hydrogen cyanide is fixed in the form of ferrocyanide, the reaction goes unexpectedly to completion in that the hydrogen cyanide bound to acetaldehyde as lactonitrile also becomes fixed as ferrocyanide, so that both these impurities are simultaneously removed.

Evidence for this is given by the fact that acrylonitrile treated in this manner shows after treatment an increase in acetaldehyde concentration. The explanation of this is that operating in alkaline medium promotes the dissociation of lactonitrile into acetaldehyde and hydrogen cyanide, which is fixed in the form of ferrocyanide as soon as it is set free. The process according to this invention is illustrated by the following reaction:

$$6HCN + FeSO_4 + 6Me(OH) = Me_4Fe(CN)_6 + Me_2SO_4 + 6H_2O$$

wherein Me may be Na, K, NH$_4$, Ba, Ca, Sr, Mg, while OH besides being the hydroxyl ion, may be also either a carbonic or a bicarbonic ion. These neutralizing agents can be employed either alone or mixed with each other. Contrary to expectation, it has been found that in this process no substantial losses of acrylonitrile occur. In fact, as the reaction takes place in alkaline medium, partial destruction of the acrylonitrile was to be expected, due to a reaction of cyanoethylation. However, this reaction does not take place because the alkali employed is converted to alkali ferrocyanide as soon as it is added to the nitrile to be treated. On the other hand, the acrylonitrile which dissolves in the layer of water and alkaline ferrocyanide can be recovered as part thereof by azeotropic distillation.

The reaction is carried out by employing the reactants in an aqueous solution or suspension. At 20° C. the reaction is completed within about 30 min. while stirring. The temperature of reaction may range from about 20 to about 70° C., but is preferably kept below about 40° C. in order not to promote the cyanoethylation of acrylonitrile, since the operation is carried out in alkaline medium. At the end of the reaction, two layers are obtained, the upper one containing purified acrylonitrile, while the lower one contains the newly formed ferrocyanide; the latter may be found completely or partially dissolved, depending upon the amount of water, the temperature of reaction and the neutralizing material or materials employed in the reaction. The process according to this invention offers the following advantages:

(a) Hydrogen cyanide contained in crude acrylonitrile in the form of free hydrogen cyanide or hydrogen cyanide combined as lactonitrile is removed until a residual amount of less than 0.05% remains.

(b) Acetaldehyde remaining in the acrylonitrile after removal of both free hydrogen cyanide and hydrogen cyanide bound as lactonitrile is readily removable by distillation since it is no longer in equilibrium with HCN.

(c) Acrylonitrile dissolved in the aqueous ferrocyanide solution is completely recoverable by azeotropic distillation;

(d) Converted hydrogen cyanide is not lost but can be recovered as ferrocyanide from the aqueous solution.

The following examples are presented without any intent, however, of thereby limiting the scope of the appended claims:

Example 1

1 kg. of crude 85% acrylonitrile comprising 2.5% of hydrogen cyanide is placed in a vessel provided with a stirrer and a refluxing condenser. Subsequently 42.5 g. of FeSO$_4$.7H$_2$O dissolved in 100 g. of H$_2$O are added, followed by the slow addition of 38 g. of NaOH dissolved in 300 g. of H$_2$O.

The temperature is maintained with a range of 20 to 40° C. The mixture is stirred for about 30 min. after the addition of sodium hydroxide has been completed. At the end of reaction two layers are obtained, the upper of which ("nitrilic" layer) contains 98% of the treated acrylonitrile. From the lower one, containing ferrocyanide, 1.76% of the treated acrylonitrile is recoverable. Thus the yield based on acrylonitrile used is 99.76%.

Example 2

Same as in Example 1; 1 kg. of crude, 85% acrylonitrile comprising 2.5% of hydrogen cyanide is placed in a vessel provided with a stirrer and a refluxing condenser.

Subsequently 42.5 g. of FeSO$_4$.7H$_2$O dissolved in 100 g. of water and 53.3 g. of KOH dissolved in 300 g. of H$_2$O are added. The operation is carried out while stirring, at temperatures ranging from 20 to 40° C. Stirring is discontinued 30 min. after the addition of potassium hydroxide has been completed. Separation of the two layers occurs as in Example 1. The yield based on supplied acrylonitrile is 99.5%.

*Example 3*

Same as in Examples 1 and 2, except that 26 g. of CaO suspended in 300 g. of $H_2O$ are substituted for sodium or potassium hydroxide.

The layer containing ferrocyanide separates as in Example 1. The yield based on supplied acrylonitrile is 99.5%.

We claim:

1. The process of purifying acrylonitrile obtained by synthesis from acetylene and hydrogen cyanide and contaminated with hydrogen cyanide and lactonitrile, comprising treating the crude acrylonitrile at a temperature below 70° C., first with ferrous sulfate in an aqueous medium, then with an alkaline material in an aqueous medium, said alkaline material being selected from the group consisting of alkali-, alkali earth-, magnesium- and ammonium-hydroxides, carbonates and bicarbonates, using stoichiometric amounts of ferrous sulfate and said material with respect to the sum of free hydrogen cyanide and hydrogen cyanide present in form of lactonitrile to form alkaline ferrocyanide, permitting the reaction mixture to separate into two layers, separating the two layers and recovering the bulk of purified acrylonitrile from the upper of said two layers.

2. The process according to claim 1, comprising recovering a small percentage of purified acrylonitrile by azeotropic distillation of the lower of said two layers.

3. The process according to claim 1, in which the temperature is kept within the range of 20° C. to 40° C.

4. The process according to claim 3, in which sodium hydroxide is used as neutralizing agent.

5. The process according to claim 3, in which potassium hydroxide is used as neutralizing agent.

6. The process according to claim 3, in which a suspension of calcium oxide is used as neutralizing agent.

References Cited in the file of this patent

UNITED STATES PATENTS

| 2,351,157 | Semon | June 13, 1944 |
| 2,680,761 | Halliwell | June 8, 1954 |

FOREIGN PATENTS

| 349,692 | Great Britain | June 4, 1931 |